United States Patent
Yuan et al.

(10) Patent No.: US 9,811,594 B2
(45) Date of Patent: Nov. 7, 2017

(54) AUTOMATIC EXPLANATION OF PRESENTED ABBREVIATIONS

(71) Applicant: Cisco Technology, Inc., San Jose, CA (US)

(72) Inventors: Wu Yuan, Suzhou (CN); Huang Haihua, Suzhou (CN); Wang Qian, Suzhou (CN)

(73) Assignee: Cisco Technology, Inc., San Jose, CA (US)

( * ) Notice: Subject to any disclaimer, the term of this patent is extended or adjusted under 35 U.S.C. 154(b) by 233 days.

(21) Appl. No.: 14/480,771

(22) Filed: Sep. 9, 2014

(65) Prior Publication Data
US 2016/0070792 A1 Mar. 10, 2016

(51) Int. Cl.
  G06F 17/00 (2006.01)
  G06F 17/30 (2006.01)
  H04L 29/06 (2006.01)
  G06F 17/27 (2006.01)

(52) U.S. Cl.
  CPC .... G06F 17/30864 (2013.01); G06F 17/2705 (2013.01); G06F 17/276 (2013.01); H04L 65/403 (2013.01)

(58) Field of Classification Search
None
See application file for complete search history.

(56) References Cited

U.S. PATENT DOCUMENTS

| 7,136,876 B1 | 11/2006 | Adar et al. | |
| 8,868,590 B1 * | 10/2014 | Donneau-Golencer | G06F 17/3053 707/733 |
| 2003/0125938 A1 * | 7/2003 | Wang | G10L 15/28 704/216 |
| 2003/0142109 A1 * | 7/2003 | Brown | G06F 3/0481 345/592 |
| 2007/0143410 A1 * | 6/2007 | Kraft | G06Q 10/107 709/206 |
| 2007/0174045 A1 * | 7/2007 | Kao | G06F 17/278 704/4 |
| 2013/0110500 A1 * | 5/2013 | Feng | G06F 17/2282 704/9 |
| 2013/0191738 A1 * | 7/2013 | Bank | G06F 17/2276 715/259 |
| 2013/0246047 A1 | 9/2013 | Vassilieva et al. | |

OTHER PUBLICATIONS

Wu et al., "Providing Content-Related Snapshots for Current Sharing", IP.com No. IPCOM000235676D, Mar. 19, 2014, 8 pages.

* cited by examiner

Primary Examiner — Apu Mofiz
Assistant Examiner — Farhad Agharahimi
(74) Attorney, Agent, or Firm — Edell, Shapiro & Finnan, LLC

(57) ABSTRACT

An abbreviation definition database is generated by analyzing online collaborative session participant content. An unexplained abbreviation is located in content currently being presented in an online collaborative session system. A definition for the unexplained abbreviation is determined from content of the abbreviation definition database. The determined definition is presented with the currently presented content through the online collaborative session system.

20 Claims, 8 Drawing Sheets

AUTOMATIC EXPLANATION OF PRESENTED ABBREVIATIONS

TECHNICAL FIELD

The present disclosure relates to online collaborative sessions, and in particular, to providing automatic explanations for abbreviations presented in online collaborative sessions.

BACKGROUND

In online collaborative sessions, an online host or presenter is generally responsible for the content and pacing of the session. For example, the presenter of an online presentation will determine the speed at which the slides are displayed, as well as when and how the session participants are allowed to ask questions. Furthermore, given that online presentations may be multicast to hundreds or even thousands of participants, it may not be feasible to allow participants to ask questions during the presentation.

Abbreviations, acronyms and terms of art are useful tools during an online collaborative session as they allow a presenter to save time while speaking, and save space in visually presented materials. It is common for a presenter to use abbreviations which may not be immediately understood by all collaborative session participants. Furthermore, if the presenter has to explain every abbreviation, acronym or term of art used in the presentation, the space saving benefits may be lost. Given the size and scope of many online collaborative sessions, it is not feasible to allow participants to ask the presenter to define abbreviations, acronyms and terms of art that are not readily understood by one or more participants.

DESCRIPTION OF EXAMPLE EMBODIMENTS

Overview

An abbreviation definition database is generated by analyzing online collaborative session participant content. An unexplained abbreviation is located in content currently being presented in an online collaborative session system. A definition for the unexplained abbreviation is determined from content of the abbreviation definition database. The determined definition is presented with the currently presented content through the online collaborative session system.

Example Embodiments

Figure 1:
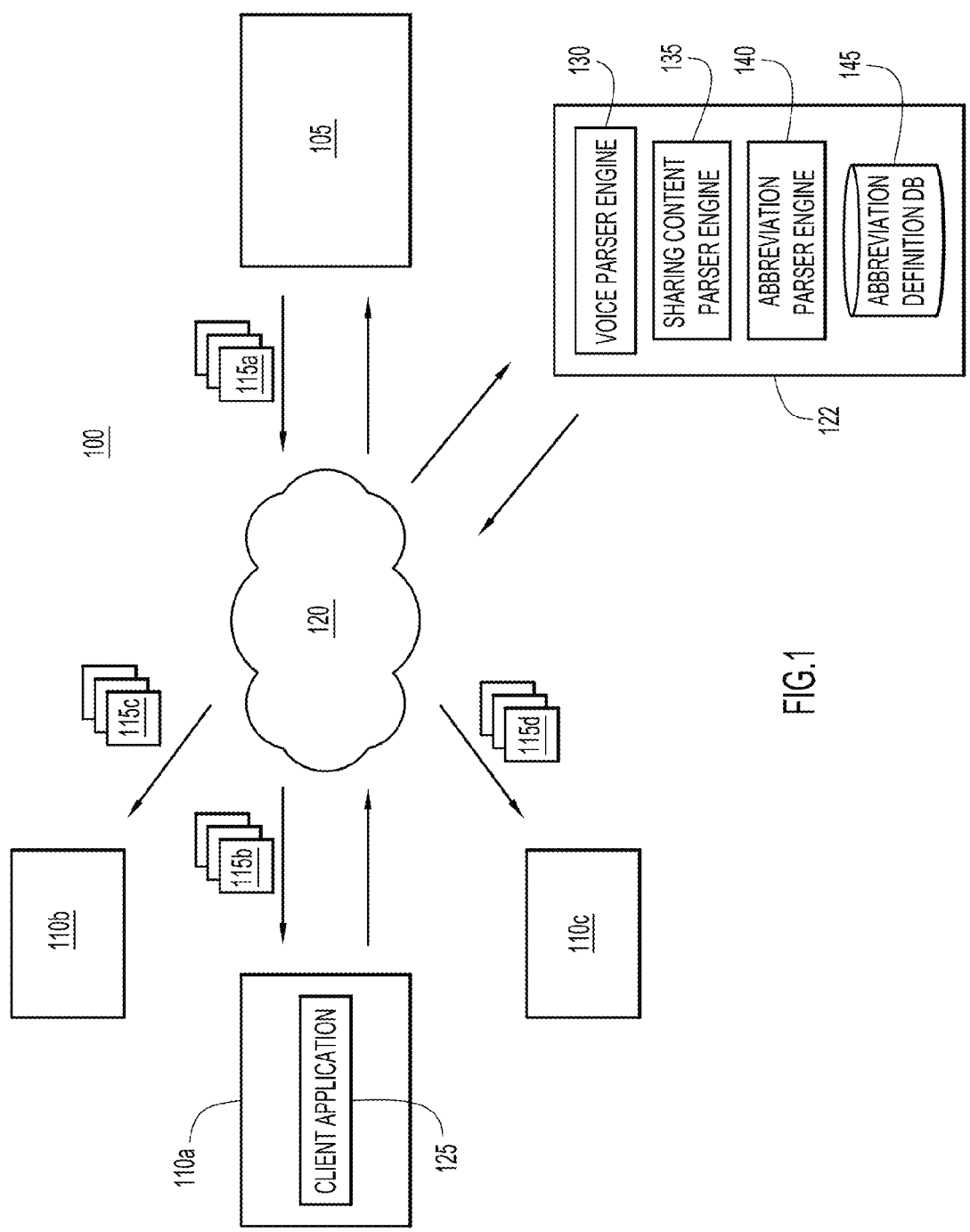
FIG. 1 is a system configured to provide automatic explanations of abbreviations presented in an online collaborative system, according to an example embodiment.

Depicted in FIG. 1 is a system 100 configured to present an online collaborative session and provide automatic explanation of presented abbreviations. System 100 comprises host/presenter 105 and participants 110a-c configured for participating in an online collaborative session, such as a real-time collaborative session.

Specifically, host/presenter 105 provides a presentation stream 115a-d through network 120. According to the example of FIG. 1, the collaborative online session is initiated from host/presenter 105 via presentation stream 115a and multicast to participants 110a-c through individual streams 115b-d. Streams 115a-d contain visual presentation data and audio presentation data, but may also include other data, such as data used to control a participant's local computing device or data used to update documents on the participant or host devices. In order to receive streams 115b-d and participate in the online collaborative session, each participant includes a client application 125. Specifically, stream 115b is received and displayed through client application 125.

According to some examples, host/presenter 105 may first transmit stream 115a to collaborative session server 122. Collaborative session server 122 then multicasts streams 115b-d to participants 110a-c, respectively. Collaborative session server 122 may also send a copy of stream 115a back to host/presenter 105, so host/presenter 105 can see the same presentation being received by participants 110a-c. Collaborative session server 122 may also provide additional functionality, such as authenticating meeting participants and recording an archive copy of stream 115a, and particular to the present disclosure, automatic explanation of presented abbreviations.

During the online collaborative session, host/presenter 105 may include an abbreviation in presentation stream 115a. As used herein, "abbreviation" may refer to any abbreviation, acronym, or contraction, as well as other words or phrases for which a technical or idiosyncratic (e.g., audience specific, presentation specific or a term of art) definition is used. An abbreviation may be presented as part of the visual presentation data in presentation stream 115a in the form of textual information, or in the audio portion of presentation stream 115a in the form of voice data. In order to provide automatic explanations of the presented abbreviations, session server 122 includes voice parser engine 130, sharing content parser engine 135, abbreviation parser engine 140, and abbreviation definition database 145. Though other embodiments may include these elements in other devices, such as host device 105, participant devices 110*a-c*, and/or a separate device configured to provide automatic explanations of presented abbreviations. According to other examples, each client application 125 will have its own voice parser engine 130, sharing content parser engine 135, abbreviation parser engine 140, and abbreviation definition database 145.

Specifically, when presentation stream 115*a* is provided to session server 122, the audio data of the presentation stream is provided to voice parser engine 130 which converts the audio data to text through the use of, for example, voice recognition software or hardware. Similarly, the sharing content parser 135 receives shared content, such as presentation slides or shared document data, and determines the textual content through, for example, text recognition software or hardware. The text generated from voice parser engine 130 and sharing content parser engine 135 is then provided to abbreviation parser engine 140. This process is conceptually illustrated in FIG. 2. The text provided by voice parser engine 130 and sharing content parser engine 135 is used by abbreviation parser engine 140 to find and explain undefined abbreviations, and also to populate abbreviation definition database 145 with abbreviations and corresponding explanations when explanations are found in the provided text. According to examples in which each client application 125 has its own voice parser engine 130, sharing content parser engine 135, abbreviation parser engine 140, and abbreviation definition database 145, the above described processes may be carried out by each participant 110*a-c*, as well as by presenter 105.

Returning to FIG. 1, once a definition of an unexplained abbreviation is determined, session server 122 will provide the definition to users 110*a-c* by including the definition in presentation streams 115*b-c* so that the definition can be presented simultaneously with the presentation data provided by host/presenter 105. Similarly, if the unexplained abbreviation is determined by an individual participant 110*a-c*, client application 125 will present the definition simultaneously with the presentation data provided by host/presenter 105.

Figure 3:
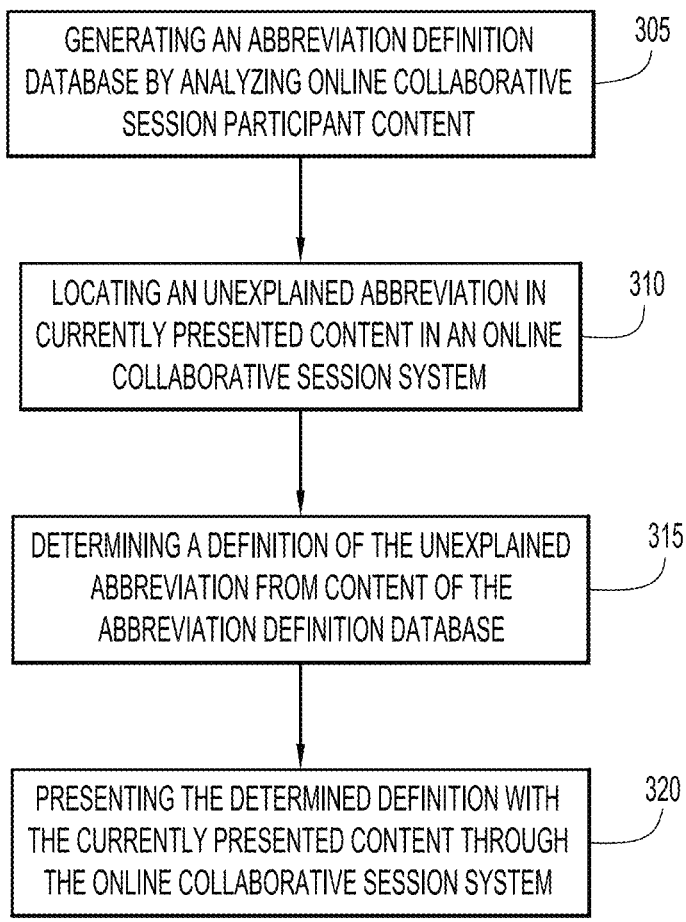
FIG. 3 is a flowchart illustrating a process for providing automatic explanations of abbreviations presented in an online collaborative system, according to an example embodiment.

With reference now made to FIG. 3, depicted therein is flowchart 300 illustrating a process carried out in order to provide automatic explanation of presented abbreviations. Specifically, it may be a process performed by an online collaborative session system, like that of system 100 of FIG. 1, and more specifically, by abbreviation parser engine 140.

The process begins in 305 where an abbreviation definition database is generated by analyzing online collaborative session participant content. For example, abbreviation definition database 145 of FIG. 1 may be populated by abbreviation parser engine 145 as it parses text presented in online collaborative session system 100. Specifically, while the system 100 is configured to automatically explain abbreviations which would otherwise be presented without explanation, system 100 may also be configured to recognize abbreviations which have been presented with an explanation. According to one such example, abbreviation parser engine 145 may parse each word provided to it by voice parser engine 130 and sharing content parser engine 135. By analyzing this received text, abbreviation parser engine 145 may not only find abbreviations, but it may also find explanations for those abbreviations. Once these explanations are found, they can be added to an abbreviation definition database. Furthermore, the generation of the abbreviation definition database may be done on an individual presenter or participant basis, as will be described in more detail with reference to FIG. 5.

In 310, unexplained abbreviations are located in content currently being presented through an online collaborative session system, such as system 100 of FIG. 1. Locating unexplained abbreviations may comprise locating possible abbreviations in the text provided to abbreviation parser engine 145 from by voice parser engine 130 and sharing content parser engine 135. Specifically, locating the unexplained abbreviations may comprise finding abbreviations in the text and further determining that no explanation is provided for the abbreviation in the text proximate to the located abbreviation. The location of the unexplained abbreviation may take place in "real time" as the content is being presented through the online collaborative session system.

In 315, a definition or explanation for the unexplained abbreviation is determined according to the content in the abbreviation definition database. For example, the abbreviation definition database may be queried to see if it contains a definition for the unexplained abbreviation located in 310. It may be the case that the abbreviation definition database contains two or more possible definitions for a single abbreviation. For example, the abbreviation "AP" may be defined as "advanced placement" or "associated press." Accordingly, the determining of 315 may comprise selecting between two or more possible definitions. This may be accomplished by considering information such as the context in which the abbreviation is presented, the identity of the online collaborative session participants, the subject of the online collaborative session, and/or weighting information contained in the abbreviation definition database. As with the location of the unexplained abbreviation, the determination of the definition of the unexplained abbreviation may be done in "real time" as the content containing the unexplained abbreviation is presented.

In 320, the determined definition is presented with the currently presented content through the online collaborative session. For example, the determined definition may be presented in a transparent text box which is overlaid on the visual content presented during the collaborative session. When the unexplained abbreviation is found in the visual content of the presentation, the transparent text box may be presented directly over or adjacent to the location of the unexplained abbreviation.

Figure 4:
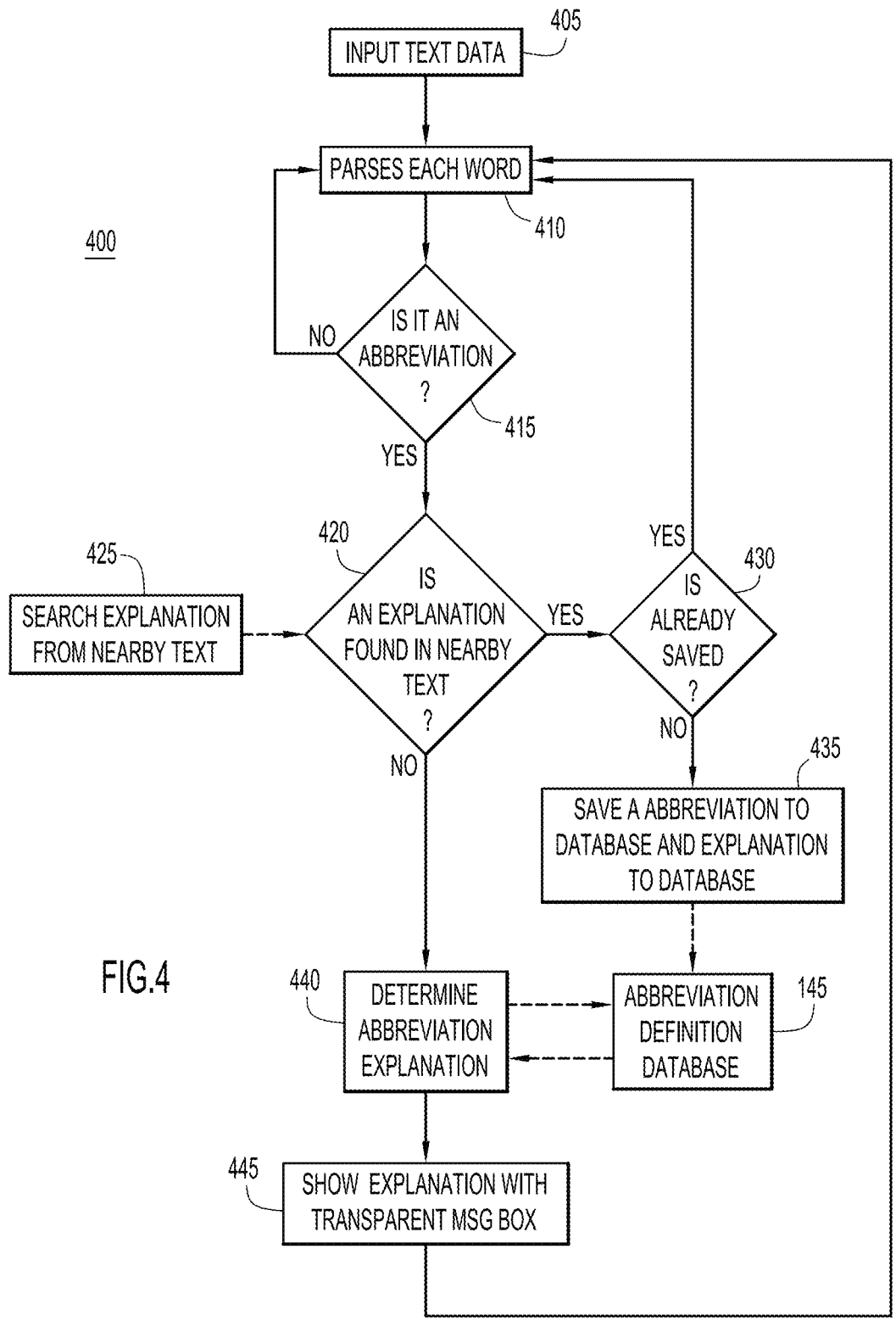
FIG. 4 is a flowchart illustrating a second process for providing automatic explanations of abbreviations presented in an online collaborative system, according to an example embodiment.

With reference now made to FIG. 4, depicted therein is another example process performed by an abbreviation parser engine, such as abbreviation parser engine 140 of FIG. 1. Specifically, flowchart 400 illustrates the processing performed by an abbreviation parser engine on the text it receives from, for example, a voice parser engine and/or a sharing content parser engine.

The text received from the voice parser engine and sharing content parser engine are input into the abbreviation parser engine in 405. Each word of the provided text is parsed in 410, and in 415 a determination is made as to whether or not the word is an abbreviation. Determining whether or not the word comprises an abbreviation may be done in multiple ways. For example, pattern recognition may be applied to the parsed word, or the parsed word may be compared to a list of possible abbreviations. If the word is determined to not be an abbreviation, the process returns to 410 and the next word in the received text is parser. On the other hand, if the word is determined to be an abbreviation, the process proceeds to 420.

In 420 a determination is made as to whether or not an explanation for the abbreviation is provided in the nearby text. Accordingly, 420 may comprises parsing and/or searching additional words from before and after the determined abbreviation in order to determine whether or not an explanation is provided in the nearby text, as illustrated in 425.

If there is an explanation for the determined abbreviation in the text nearby to the determined abbreviation, the process moves to 430 where a determination is made as to whether or not the explanation is already contained within the abbreviation explanation database 145. If an explanation of the determined abbreviation is already in the abbreviation database 145, no further steps are taken with regard to the determined abbreviation, and the process returns to 410 to parse the next word in the received text. On the other hand, if the determined abbreviation is not contained in the abbreviation definition database 145, in 435 the determined abbreviation and the explanation found in the nearby text are both added to the abbreviation definition database 145. Once the determined abbreviation and corresponding explanation are added to the abbreviation definition database 145, the process returns to 410 in order to parse the next word of the received text.

On the other hand, if it is determined in 420 that an explanation for the determined abbreviation is not contained in the nearby text, an attempt is made in 440 to determine the explanation for the determined abbreviation from the abbreviation definition database 145. Specifically, the abbreviation definition database 145 is queried based on the value of the determined abbreviation. If abbreviation definition database 145 contains an explanation for the determined abbreviation, the explanation will be returned to the abbreviation parser engine, and in 445 the abbreviation parser engine will provide the explanation to online collaborative session participants through, for example, streams 115*b-d* of FIG. 1. It should be noted that abbreviation definition database 145 is not just limited to the information added to it in 435. Instead, abbreviation definition database 145 may include additional information, and may be populated according to the processes described with reference to FIG. 5, infra.

The determination of the abbreviation explanation may be a multi-step process which requires additional searching of the text received in 405. For example, some abbreviations will have multiple definitions, and therefore, abbreviation database 145 may return more than one definition in 440. In order to select from multiple definitions, the abbreviation parser may search the text nearby the determined abbreviation for context clues which will allow the abbreviation parser to select from multiple definitions. The abbreviation parser may also consider other information to determine which of the multiple definitions to use. This other information may include the subject of the online collaborative session, information pertaining to the users attending the online collaborative session (e.g., user profile information), organizations associated with the online collaborative session (e.g., employers), and/or weights applied to the definition based on information associated with one or more of the host/presenter or the participants.

Furthermore, while only a single abbreviation definition database is illustrated, 440 may search multiple abbreviation definition databases. For example, 440 may search a participant's local database. If this search returns multiple possible definitions, a further search may be performed on a presenter-specific database, or an organization-specific database to determine which of the multiple definitions is the correct one. To once again use the "AP" example, a participant's local database may return both the "associated press" and the "advanced placement" definitions. In order to select between these two definitions, the presenter's database may be queried. If the presenter's database only contains the "associated press" definition, this may be determined to be the more likely of the two definitions.

Finally, once the explanation is provided to the online collaborative session users, the process will return to 410 to parse the next word.

It should be noted that additional steps may be added to flowchart 400 and/or the illustrated steps may take place in a different order. For example, an additional search of abbreviation database 145 may take place between 415 and 420. If this searching of abbreviation database 145 returns one or more abbreviation explanations, the searching of nearby text in 420 can serve as a consistency check on the explanation contained in abbreviation definition database 145, or the searching may allow the abbreviation parser to select from among multiple explanations contained in abbreviation definition database 145.

The process of FIG. 4 may also include additional unillustrated steps. For example, if a meeting participant notices that the definition determined in step 440 is not the correct abbreviation, the online collaborative session may provide the ability for participants to correct the incorrect abbreviation. For example, the online collaborative session may leverage voice parser engine 130, and allow participants to state the correct definition. The voice parser will register this correction, and the abbreviation definition database will be corrected accordingly. Similarly, the client application 125 depicted in FIG. 1 may allow participants to manually correct abbreviation definitions. For example, the client application may allow users to click the displayed definition. Clicking the definition may initiate portions of a graphical user interface that allow participants to manually enter a correct abbreviation definition.

Additional steps may also include populating the abbreviation definition database subsequent to showing the explanation in 445. For example, once a particular definition is displayed in 445, the abbreviation definition database 145 may be updated to reflect this new usage of the definition. According to one specific example, because the definition was recently used, the database can be updated to more heavily weight the recently used definition as compared to other possible definitions.

Figure 5:
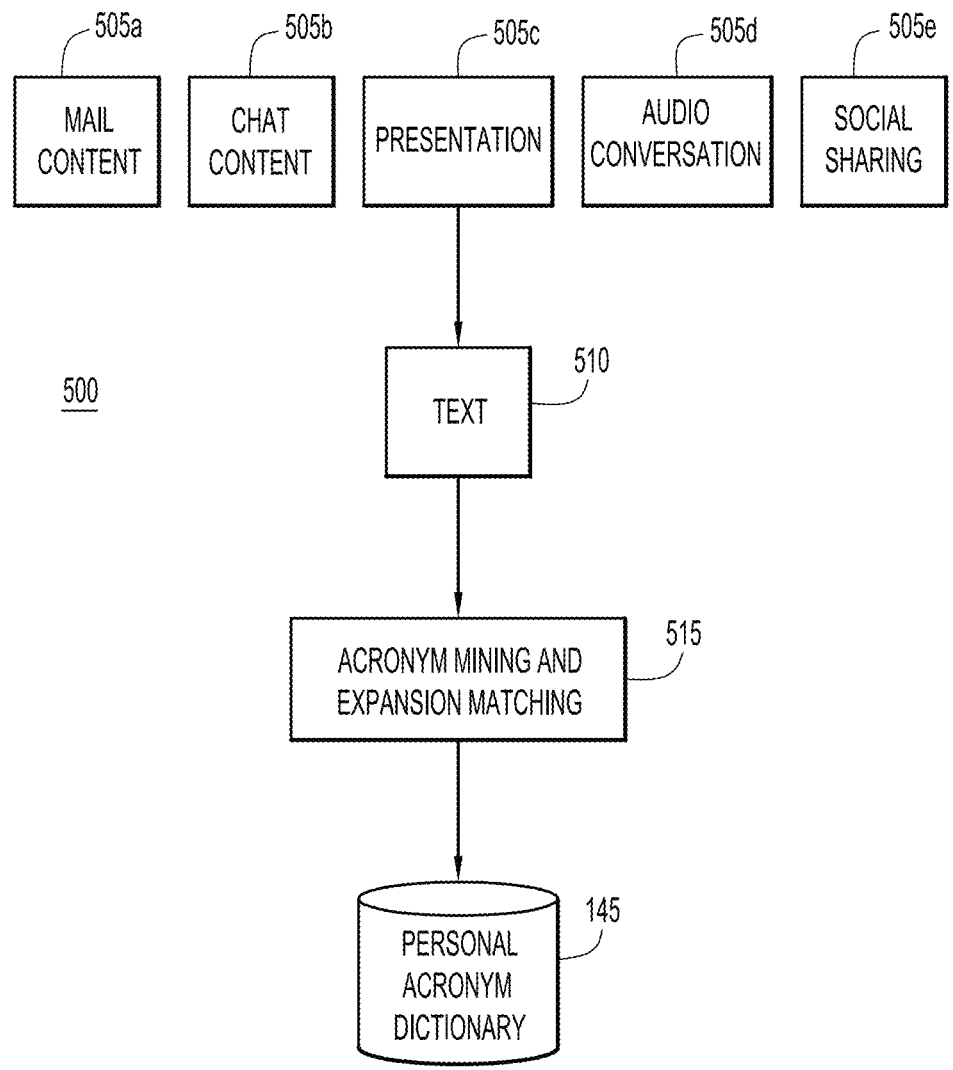
FIG. 5 is a block diagram illustrating the population of an abbreviation definition database, according to an example embodiment.

With reference now made to FIG. 5, depicted therein is a block diagram illustrating how an abbreviation definition database may be populated. By building an abbreviation database, the process of determining the correct definition for which there may be multiple possibilities can be simplified. For example, attempting to semantically determine which one of a plurality of definitions is the correct definition for the specific context within which the abbreviation was used can be a complex and resource intensive process. On the other hand, by utilizing an abbreviation database, the process can be simplified and determining the correct abbreviation can be accomplished while utilizing fewer resources. For example, an unexplained abbreviation may have multiple possible definitions. As previously mentioned, "AP" can have two definitions. If "AP" is used in presentation content, determining which of the two definitions to select based on the context within which it is used is a resource intensive and complex process. On the other hand, if an abbreviation definition database is used which has been populated based on presenter, meeting participant, or meeting organization specific content, it may be more likely that the definition contained in the abbreviation definition database is the correct definition. This determination is much less complex and resource intensive than trying to select a definition based on the context within which the abbreviation was used.

Specifically, illustrated in FIG. 5 is a plurality of abbreviation definition sources 505*a-e*. Each of these sources may correspond to possible abbreviation sources for an individual presenter, or contain information for multiple presenters, but which include a designation of individual presenters. Furthermore, these abbreviation sources may contain information for any online collaborative session participant, not just presenters. Additionally, the sources may provide information from individual organizations (e.g., corporations, business associates, etc.), or sub-groupings within organizations (e.g., working groups, business units, geographically defined units, etc.). For example, while mail content source 505*a* may contain content for multiple presenters, the "To" and "From" fields of the mail data may be used to find data specific to an individual presenter. The mail content source 505*a* may also contain content for an entire company, or a subset of employees within a company.

Source 505*c* comprises presentation content, and therefore, may correspond to the presentation content discussed in conjunction with FIGS. 3 and 4. Accordingly, presentation abbreviation definition source 505*c* may be used to populate a presenter-specific abbreviation definition database in real-time with the presentation of the content. The other abbreviation sources, which include mail content source 505*a*, chat content source 505*b*, audio conversation source 505*d* and social sharing source 505*e* can be mined at any time. Similarly, as online collaborative session systems often record each collaborative online session, presentation source 505*c* need not necessarily be mined in real time with the initial presentation of the content.

Accordingly, the abbreviation definition database 145 can continue to be populated and grow as the presenter, participants, and organizations change and grow. For example, an organization may initially use a particular acronym or abbreviation to refer to a particular product. At some other time in the future, that same acronym may be used to refer to a different product. Because the abbreviation definition database continues to grow with the presenters, participants and organizations, this change in the usage of the acronym will be captured through the analysis of sources 505*a-c*. Furthermore, the recency of the usage of the new abbreviation can be used in the determination of the abbreviation definition. For example, the more recently used definition may be more likely to be determined to be the correct definition for an abbreviation contained in a presentation.

Figure 2:
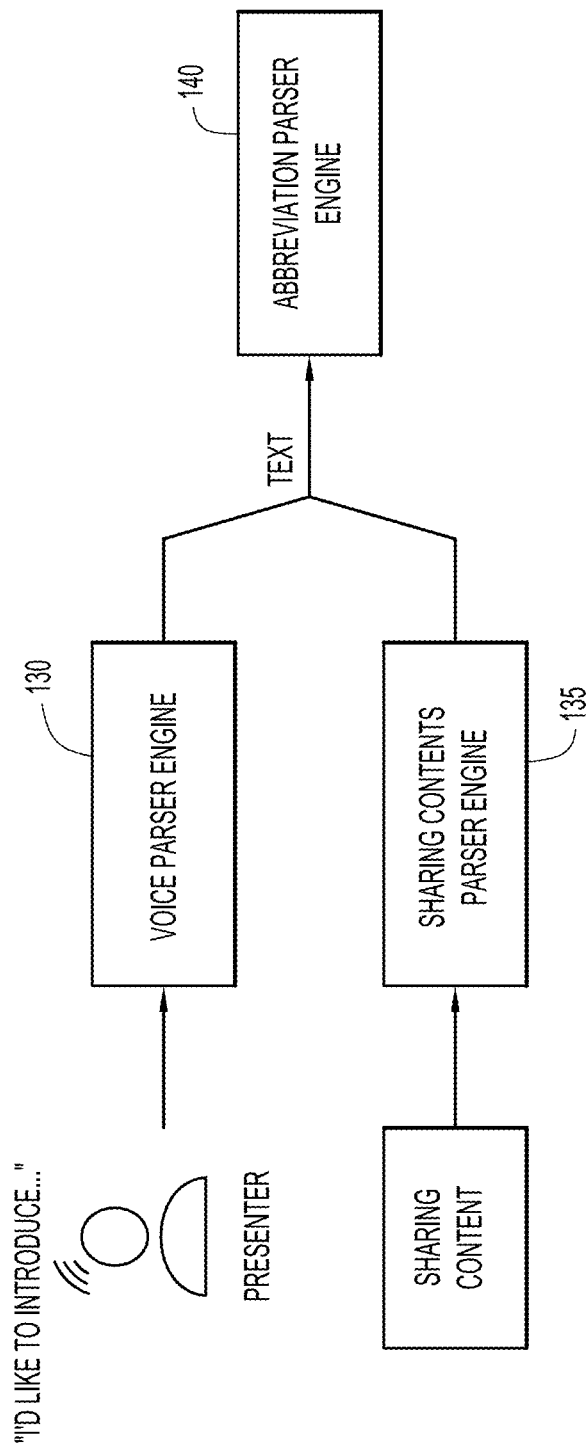
FIG. 2 is block diagram illustrating how audio presentation information and visual presentation information is parsed to form text which can be searched in order to provide automatic explanations of abbreviations presented in an online collaborative system, according to an example embodiment.

Each of the abbreviation definition sources 505*a-e* may be parsed into text, similar to the process described with reference to voice parser engine 130 and sharing content parser engine 135 of FIGS. 1 and 2. Abbreviations may be located within the parsed text in a manner similar to that described above in conjunction with reference numerals 420, 425, 430 and 430 of FIG. 4.

In addition to storing presenter, participant or organization specific abbreviations and abbreviation definitions, user specific abbreviation definition database 145 may weight or otherwise rank abbreviation definitions when multiple definitions appear for a single abbreviation. For example, abbreviation definitions may be weighted based on the frequency with which they appear in a presenter's source data, the recency with which each definition appeared in a presenter's source data, and also how well the user correlates to the particular presenter. For example, user A communicates with user B via email, and mentions that "WWF" is defined as "webex web framework." Similarly, User B may communicate with User C via email, and mentions that "WWF" is defined as "web work flow." Both the "webex web framework" and the "web work flow" definitions may be imported into User B's presenter specific abbreviation definition database, but the "web work flow" definition may be more highly correlated with User B because User B is the presenter who provided that definition. The "webex web framework" definition would also be correlated with User B because it appeared in User B's email, but it would receive a lower correlation value because it was User A who provided the definition.

Furthermore, multiple types of weighting may be used generate an overall ranking for each definition. For example, definitions may be ranked according to the following expression:

$$\Sigma_{k=1\ldots n}[\text{Correlation/Recency}]; \quad\quad \text{Exp. 1}$$

where "n" is the number of occurrences of the definition.

Similarly, participant specific abbreviation databases can also be created. For example, abbreviation definition database 145 of FIG. 1 may include information for the participants 110*a-c*, not just host/presenter 105. Accordingly, when determining which abbreviation definition to include with the presentation content, abbreviation parser engine 140 may base its decision on the definition rankings for host/presenter 105 in conjunction with participants 110*a-c*. According to one specific example, the abbreviation definition to be displayed may be selected according to which definition has the highest value for the following expression:

$$\text{Score on presenter's abbreviation definition dictionary} * \Sigma_{k=1\ldots n}[\text{score in each participants' abbreviation definition dictionary}] \quad\quad \text{Exp. 2}$$

where "n" is the number of overlapping attendees. The evaluation of this expression may be considered an "overlap factor" between the presenter and the meeting participants. Accordingly, if presenter A has recently been in contact with group M and group N, and the two groups define "WWF" differently, when presenter A has an online meeting with attendees who are predominantly in group M, expression 2 will compute an overlap factor among all attendees, and will likely return the definition used by group M. Similarly, if presenter A has an online meeting with attendees who are predominantly in group N, expression 2 will compute an overlap factor among all attendees, and will likely return the definition used by group N.

Similarly, if there is no definition in the presenter's abbreviation definition dictionary, the definition to be displayed may be selected from only the participants' abbreviation definition dictionary. In other words, the selected definition would be the definition with the highest value according to the following expression:

$$\Sigma_{k=1\ldots n}[\text{score in each participants' abbreviation definition dictionary}] \quad\quad \text{Exp. 3}$$

where "n" is the number of overlapping attendees.

Furthermore, the process of determining the correct abbreviation may consider a combination of the expressions 1, 2 and 3. For example, the process of determining the correct expression may first look at the text surrounding a presented abbreviation. If this fails to return a definition, the process may evaluate expression 2. If expression 2 fails to return a definitive result, the process will evaluate expression 3.

The process can also make a determination as to whether or not it is even necessary to display a definition. For example, if an evaluation of expression 1 shows a correlation above a particular threshold, it may be determined that the participant is very familiar with the abbreviation definition. Accordingly, it is unnecessary to display the definition for that user. One the other hand, other participants of the same presentation may not have the same high correlation with a particular definition, e.g., the evaluation of expression 1 is below a particular threshold. For these participants, it may be deemed necessary to display the determined definition.

Figure 6:
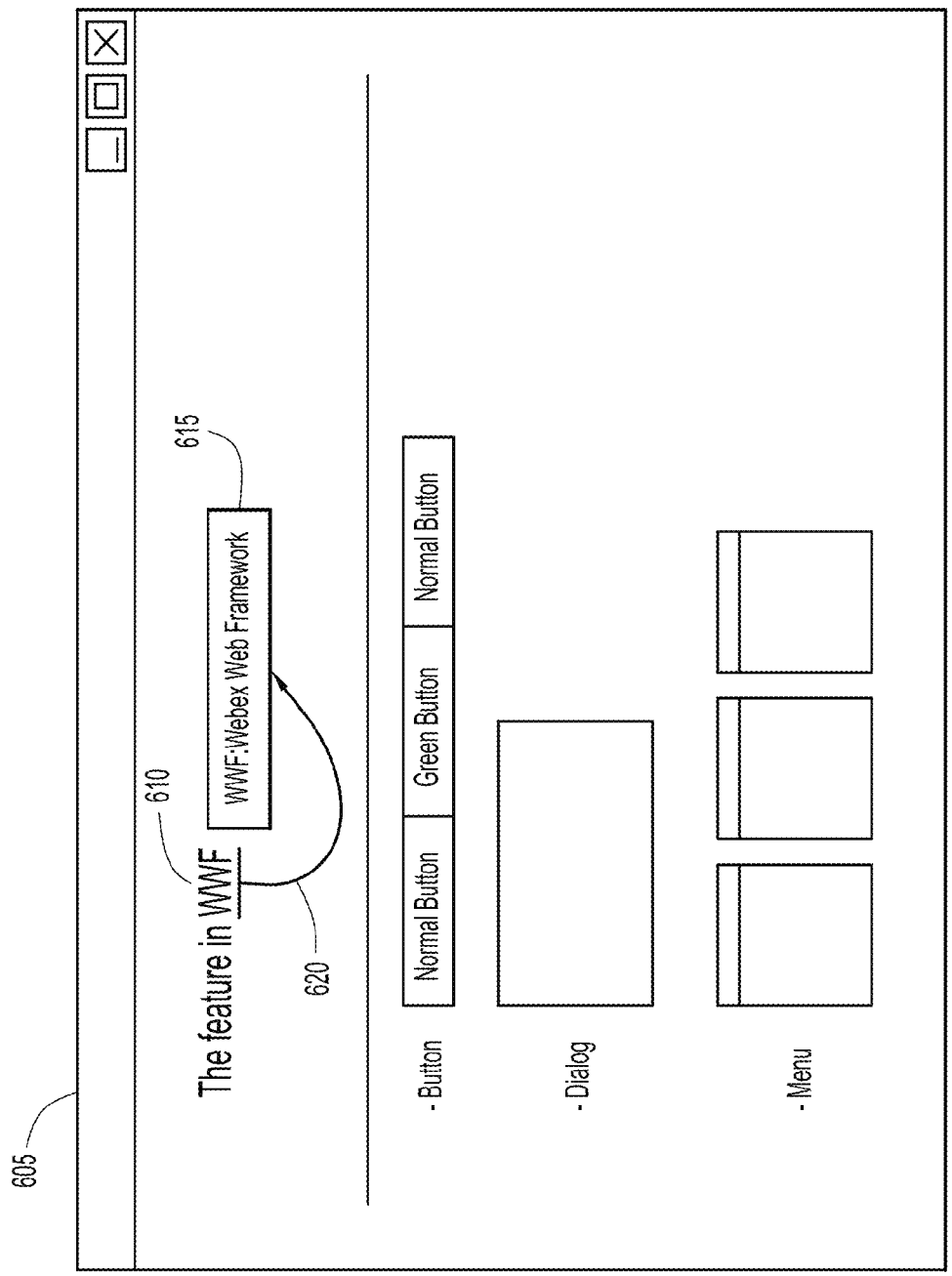
FIG. 6 is a screenshot of an online collaborative session illustrating an automatic explanation of an abbreviation visually presented during an online collaborative session, according to an example embodiment.

With reference now made to FIG. 6, depicted therein is an example embodiment in which an abbreviation definition is automatically added to visual presentation information which did not include an abbreviation definition. Specifically, visual presentation information 605 includes unexplained abbreviation 610. In response to the automatic explanation of presented abbreviations techniques described above, an explanation of abbreviation 610 is added to visual presentation information 605 in the form of transparent text box 615. Accordingly to the example of FIG. 6, transparent text box 615 is placed in the vicinity of abbreviation 610, and indicator 620 further illustrates that text box 615 provides an explanation for abbreviation 610.

Figure 7:
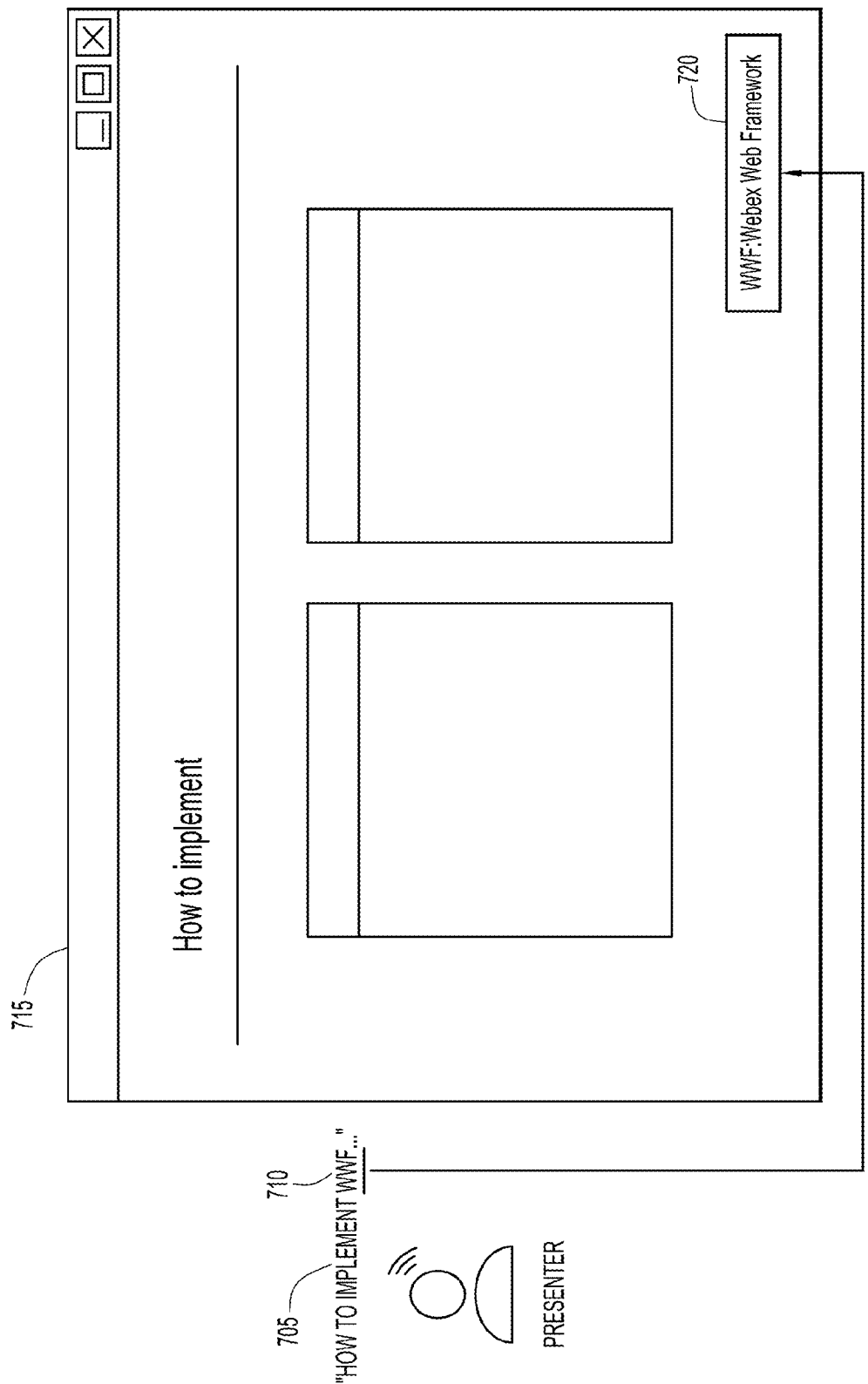
FIG. 7 is a screenshot of an online collaborative session illustrating an automatic explanation of an abbreviation spoken during an online collaborative session, according to an example embodiment.

With reference now made to FIG. 7, depicted therein is an example embodiment in which an abbreviation definition is automatically added to visual presentation information in response to audio presentation content failing to provide an abbreviation definition. Specifically, audio presentation information 705 includes unexplained abbreviation 710. In response to the automatic explanation of presented abbreviations techniques described above, an explanation of abbreviation 710 is added to visual presentation information 715 in the form of transparent text box 720.

Figure 8:
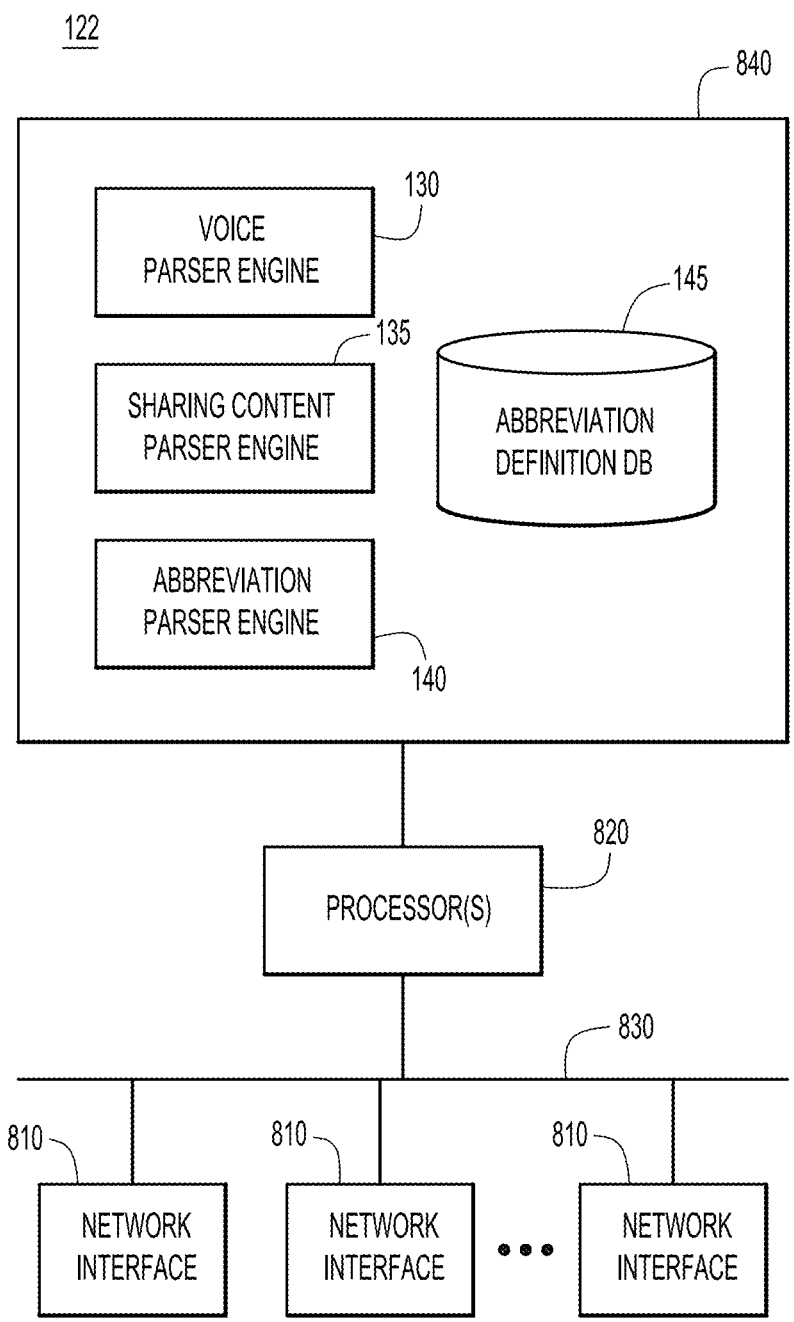
FIG. 8 is a block diagram illustrating a device configured to provide automatic explanations of abbreviations presented in an online collaborative system, according to an example embodiment.

Referring now to FIG. 8, an example block diagram is shown of a device 122, such as a collaborative session server, configured to perform the techniques described herein. Collaborative session server 122 comprises network interfaces 810 which may be used to connect collaborative session participants and presenters through a network. A processor 820 is provided to coordinate and controls collaborative session server 122. The processor 820 is, for example, one or more microprocessors or microcontrollers, and it communicates with the network interface 810 via bus 830. Memory 840 comprises software instructions which may be executed by the processor 820. For example, software instructions for collaborative session server 122 includes instructions for voice parser engine 130, sharing content parser engine 135, and/or abbreviation parser engine 140, as described above. Abbreviation definition database 145 may also be stored in memory 840. In other words, memory 840 includes instructions that collaborative session server 122 uses to carry out the operations described above in connection with FIGS. 1-7.

Memory 840 may comprise read only memory (ROM), random access memory (RAM), magnetic disk storage media devices, optical storage media devices, flash memory devices, electrical, optical or other physical/tangible (e.g. non-transitory) memory storage devices. Thus, in general, the memory 840 may comprise one or more tangible (non-transitory) computer readable storage media (e.g., a memory device) encoded with software comprising computer executable instructions. When the software, e.g. voice parser engine 130, sharing content parser engine 135, and/or abbreviation parser engine 140, is executed (by the processor 820), the processor is operable to perform the operations described herein in connection with FIGS. 1-7. While the above description refers to collaborative session server 122, processor 820, memory 840, bus 830, and network interfaces 810 may also be embodied in other devices, such as a host/presenter device 105 or a participant device 110 of FIG. 1.

The above description is intended by way of example only.

What is claimed is:

1. A computer-implemented method comprising:
analyzing online collaborative session participant content;
locating an unexplained abbreviation in currently presented content in an online collaborative session system, wherein the currently presented content was provided to the online collaborative session by a presenter;
retrieving a plurality of definitions for the unexplained abbreviation from an abbreviation definition database, wherein retrieving the plurality of abbreviations from the abbreviation definition database comprises retrieving for each of the plurality of definitions a value correlating an abbreviation with the presenter of the presented content;
selecting a definition from the plurality of definitions by determining a first possible definition from the plurality of definitions that was previously used by the presenter in conjunction with a first subset of participants to the online collaborative session in at least a first previous communication between the presenter and the first subset of participants, determining a second possible definition from the plurality of definitions that was previously used by the presenter in conjunction with a second subset of participants to the online collaborative session in at least a second previous communication between the presenter and the second subset of participants, and selecting the first possible definition in response to the first subset of participants having a greater number of participants than the second subset of participants; and
presenting the definition selected from the plurality of definitions with the currently presented content through the online collaborative session system.

2. The method of claim 1, wherein locating the unexplained abbreviation comprises locating the unexplained abbreviation in audio presentation content utilizing speech recognition.

3. The method of claim 1, wherein locating the unexplained abbreviation comprises searching presented textual information.

4. The method of claim 3, wherein:
searching the presented textual information comprises:
searching the presented textual information for a potentially unexplained abbreviation,
further searching the presented textual information nearby the potentially unexplained abbreviation for a presented definition, and
retrieving the plurality of definitions comprises retrieving the plurality of definitions in response to failing to locate a presented definition in the presented textual information nearby the potentially unexplained abbreviation.

5. The method of claim 1, wherein presenting the determined definition comprises visually displaying, through the online collaborative session system, the determined definition concurrently with the presented information containing the unexplained abbreviation.

6. The method of claim 1, wherein presenting the determined definition comprises visually displaying the determined definition without obstructing other presented content.

7. The method of claim 6, wherein presenting the determined definition comprises visually displaying the determined definition in a transparent text box.

8. The method of claim 1, further comprising populating the abbreviation definition database by searching the presented textual information for a presented abbreviation and a corresponding presented definition.

9. The method of claim 1, wherein selecting the definition from the plurality of definitions further comprises selecting the definition from the plurality of definitions based on the content currently presented in the online collaborative session system.

10. The method of claim 1, wherein retrieving the plurality of definitions comprises retrieving the plurality of definitions from an online collaborative session presenter-specific database.

11. The method of claim 1, wherein retrieving the plurality of definitions comprises retrieving the plurality of definitions from an online collaborative session participant-specific database.

12. An apparatus comprising:
a network interface unit to enable communication over a network as part of an online collaborative session system; and
a processor coupled to the network interface unit, to:
analyze online collaborative session participant content;
locate an unexplained abbreviation in currently presented content in an online collaborative session system, wherein the currently presented content was provided to the online collaborative session by a presenter;
retrieve a plurality of definitions for the unexplained abbreviation from an abbreviation definition database, wherein retrieving the plurality of abbreviations from the abbreviation definition database comprises retrieving for each of the plurality of definitions a value correlating an abbreviation with the presenter of the presented content;
select a definition from the plurality of definitions by determining a first possible definition from the plurality of definitions that was previously used by the presenter in conjunction with a first subset of participants to the online collaborative session in at least a first previous communication between the presenter and the first subset of participants, determining a second possible definition from the plurality of definitions that was previously used by the presenter in conjunction with a second subset of participants to the online collaborative session in at least a second previous communication between the presenter and the second subset of participants, and selecting the first possible definition in response to the first subset of participants having a greater number of participants than the second subset of participants; and
present the definition selected from the plurality of definitions with the currently presented content through the online collaborative session system.

13. The apparatus of claim 12, wherein the processor is further configured to locate the unexplained abbreviation in audio presentation content utilizing speech recognition.

14. The apparatus of claim 12, wherein the processor is further configured to locate the unexplained abbreviation by searching presented textual information.

15. One or more tangible, non-transitory computer readable storage media encoded with software comprising computer executable instructions and when the software is executed operable to:
analyze online collaborative session participant content, wherein the currently presented content was provided to the online collaborative session by a presenter;
locate an unexplained abbreviation in currently presented content in an online collaborative session system;
retrieve a plurality of definitions for the unexplained abbreviation from an abbreviation definition database, wherein retrieving the plurality of abbreviations from the abbreviation definition database comprises retrieving for each of the plurality of definitions a value correlating an abbreviation with the presenter of the presented content;
select a definition from the plurality of definitions by determining a first possible definition from the plurality of definitions that was previously used by the presenter in conjunction with a first subset of participants to the online collaborative session in at least a first previous communication between the presenter and the first subset of participants, determining a second possible definition from the plurality of definitions that was previously used by the the presenter in conjunction with a second subset of participants to the online collaborative session in at least a second previous communication between presenter and the second subset of participants, and selecting the first possible definition in response to the first subset of participants having a greater number of participants than the second subset of participants; and
present the definition selected from the plurality of definitions with the currently presented content through the online collaborative session system.

16. The tangible, non-transitory computer readable storage media of claim 15, wherein the instructions operable to locate the unexplained abbreviation comprise instructions operable to locate the unexplained abbreviation in audio presentation content utilizing speech recognition.

17. The tangible, non-transitory computer readable storage media of claim 15, wherein the instructions operable to locate the unexplained abbreviation comprise instructions operable to locate the unexplained abbreviation by searching presented textual information.

18. The tangible, non-transitory computer readable storage media of claim 15, further comprising instructions operable generate the abbreviation definition database as an abbreviation definition database specific to at least one of an online collaborative session presenter, an online collaborative session participant or an organization.

19. The apparatus of claim 12, wherein the processor is further configured to populate the abbreviation definition database by searching the presented textual information for a presented abbreviation and a corresponding presented definition.

20. The tangible, non-transitory computer readable storage media of claim 15, further comprising instructions operable to populate the abbreviation definition database by searching the presented textual information for a presented abbreviation and a corresponding presented definition.

* * * * *